S. R. SMITH.
DEVICE FOR TEACHING PENMANSHIP.
APPLICATION FILED JAN. 7, 1910.
972,273.
Patented Oct. 11, 1910.
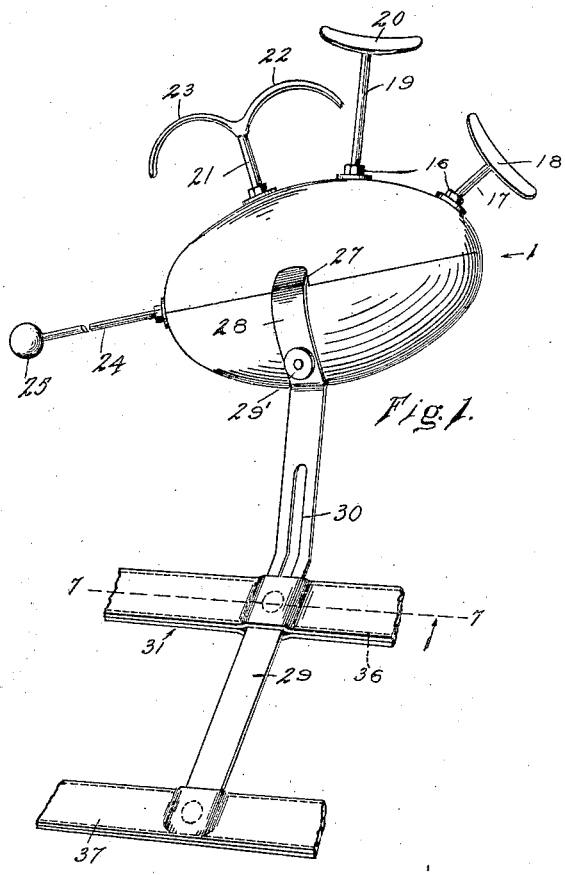
Fig. 1.
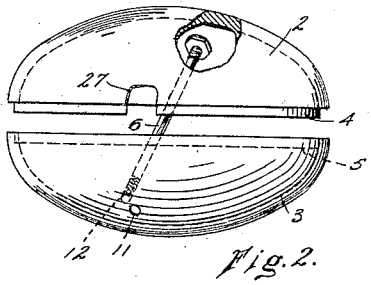
Fig. 4.
Fig. 2.
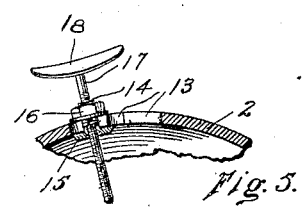
Fig. 5.
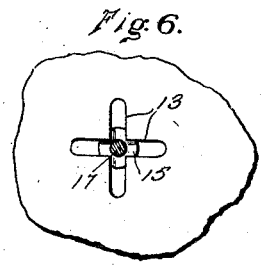
Fig. 6.
Fig. 3.
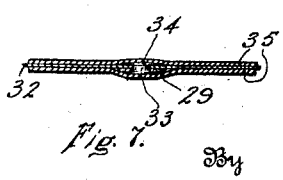
Fig. 7.
Witnesses
J. S. Freeman.
Inventor
S. R. Smith,
By C. L. Parker, Attorney

UNITED STATES PATENT OFFICE.

SIDNEY R. SMITH, OF GAINESVILLE, TEXAS.

DEVICE FOR TEACHING PENMANSHIP.

972,273. Specification of Letters Patent. Patented Oct. 11, 1910.

Application filed January 7, 1910. Serial No. 536,785.

*To all whom it may concern:*

Be it known that I, SIDNEY R. SMITH, citizen of the United States, residing at Gainesville, in the county of Cooke and State of Texas, have invented certain new and useful Improvements in Devices for Teaching Penmanship, of which the following is a specification.

My invention relates to a device for teaching penmanship, and has particular reference to a device of this character embodying new and useful improvements upon my prior Patent No. 940,744.

An important object of my invention is to provide a device of the above character which may be readily adjusted to fit any size hand.

My invention consists generally in the arrangement and combination of parts to be hereinafter described.

In the accompanying drawings forming a part of this specification, and in which like numerals are employed to designate like parts throughout the same, Figure 1 is a perspective view of the device as a whole. Fig. 2 is a side view of the body portion of the device, the same being shown in an open position. Fig. 3 is an end view of the body portion shown in Fig. 2. Fig. 4 is a detail sectional view showing the manner in which the connecting rod is secured to one of the members of the body portion. Fig. 5 is a detail sectional view through a portion of the body of the device, showing the manner in which the arm for supporting the thumb is secured to said body. Fig. 6 is an enlarged detail view of a portion of the body of the device adjacent the arm supporting the thumb. Fig. 7 is a sectional view taken on line 7—7 of Fig. 1.

In the preferred embodiment of my invention, as illustrated in the drawings, 1 designates the body of the device which is shown as being substantially egg-shaped.
The body 1 is hollow and is formed of two like portions 2 and 3 which are provided with interlocking edges 4 and 5 respectively. The body 1 is preferably made of aluminum on account of the lightness of this metal.
The portions 2 and 3 are normally held together by means of a connecting rod 6, which is provided at one end with a head 7. The connecting rod 6 passes through the portion 2 and the head 7 is disposed within a recess formed upon the outer surface of said portion 2, whereby said head 7 is flush with said outer surface. A washer 8 surrounds the connecting rod 6 and is disposed adjacent the inner surface of the portion 2 and the washer 8 is clamped against the portion 2 by means of a nut 9 which is arranged upon the enlarged screw-threaded portion 10 of said connecting rod 6. It is thus seen that one end of the connecting rod 6 is rigidly secured to the portion 2 while the opposite end of the connecting rod is adapted to be inserted through an opening 11 formed upon the portion 3. The connecting rod 6 is screw-threaded as at 12 for a purpose to be hereinafter explained. In my prior Patent No. 940,744, the means carried by the body portion for maintaining the fingers in proper position for writing, were longitudinally adjustable, while no provision was made whereby the means could be angularly adjusted. In the present invention means are provided whereby the means which maintain the fingers in proper position for writing may be longitudinally and angularly adjusted.

The portion 2 is provided near one end thereof with slots 13 which are at substantially right angles to each other. I further provide a tubular sleeve 14 having an inner flanged end 15, said sleeve 14 being adapted to be moved longitudinally in each of the slots 13. The sleeve 14 is externally screw-threaded for the reception of a nut 16. The sleeve 14 is provided with a washer which surrounds the same and is disposed below said nut 16. By this construction it is obvious that the sleeve 14 may be moved longitudinally within each of the slots 13 and clamped to the portion 2 in a desired position, by the manipulation of the nut 16. The tubular sleeve 14 is internally screw-threaded for the reception of an externally screw-threaded pin 17, which has secured upon its outer end a bow-shaped piece of metal 18, which in turn is adapted to serve as a support for the thumb. It is obvious by the construction above described that the pin 17 may be longitudinally adjusted, and that the same may be angularly adjusted with relation to the body 1. The angular adjustment of the pin 17 is caused by the said pin being moved along the curved surface of the portion 2. At one side of the pin 17 the portion 2 carries a second pin 19, which is a little longer than pin 17 and carries at its outer end a bow-shaped piece of metal 20, for the support of the middle finger. The portion 2 is further provided with a short pin 21, which is provided with two divergently curved fingers 22 and 23 under which the fourth and fifth fingers are designed to be confined. It is to be understood that the pins 19 and 21 are mounted upon the portion 2 in a like manner to the pin 17 and therefore this specific construction need not be described again. The pins 19 and 21 are therefore longitudinally and angularly adjustable.

Extending from one end of the body 1 is a supporting rod 24, which is provided at its free end with a ball 25. The rod 24 is mounted upon the body 1 in a similar manner to the pin 17, except that the sleeve 14 upon which the rod 24 is mounted, is disposed within a circular opening 26 instead of being arranged to operate within angularly arranged grooves 13. The sleeve 14 supporting the rod 24 may thus be moved within the opening 26 and clamped to the body 1 in a desired position.

The portion 2 is provided adjacent its edge 4 with an opening 27 for the reception of the bent end 28 of a metal strip 29. The connecting rod 6 above referred to is arranged within the opening 11 upon the portion 3 and further extends through an opening provided upon the bent end 28. A nut 29' is arranged upon the screw threaded end 12 of the connecting rod 6 and thus clamps the bent end 28 to the portion 2. The metal strip 29 is somewhat bent to conform to the curvature of the wrist. Near the middle of the metal strip 29 is formed a longitudinal slot 30. Arranged upon the metal strip 29 and near the middle thereof is a strap 31 for binding the strip 29 to the arm of the wearer. The strap 31 comprises a thin resilient metal strip 32 upon which is rigidly secured a stud 33 having flanged ends 34. The stud 33 is adapted to operate within the slot 30. The strip 32 is covered upon both sides thereof by sections 35 of such pliable material as cloth or leather. The sections 35 extend laterally beyond the metallic strip 32 and said sections 35 are stitched together along their edges as at 36. By the construction above described the entire strap 31 may be moved longitudinally of the metallic strip 29, when so desired. A second strap 37 is connected to the free end of the metallic strip 29.

Having fully described my invention, I claim:—

1. A device of the character described, comprising a body adapted to be held in the hand, and angularly adjustable means carried by said body for maintaining the fingers in proper position for writing.

2. A device of the character described, comprising a body adapted to be held in the hand, and longitudinally and angularly adjustable means carried by said body for maintaining the fingers in proper position for writing.

3. A device of the character described, comprising a body adapted to be held in the hand, longitudinally and angularly adjustable means carried by said body for maintaining the fingers in proper position for writing, and means carried by said body for maintaining the hand in proper position for writing.

4. A device of the character described, comprising a body, pins mounted upon said body and provided with means for maintaining the fingers in proper position for writing, each of said pins being longitudinally adjustably mounted within a sleeve, and said sleeve being movably mounted upon said body.

5. A device of the character described, comprising a body, adapted to be held in the hand, pins mounted upon said body and provided with means for maintaining the fingers in proper position for writing, each of said pins being longitudinally adjustably mounted within a sleeve, said sleeve being movably mounted within a slot formed upon said body, and means for clamping said sleeve in a desired position upon said body.

6. A device, of the character described, comprising a body adapted to be held in the hand, means carried by said body for maintaining the fingers in proper position for writing, and means carried by said body for preventing the tilting of the hand, said last named means being angularly adjustable.

7. A device of the character described, comprising a hollow body adapted to be held in the hand, said body being formed of a plurality of separable portions, angularly adjustable means for maintaining the fingers in proper position for writing, and angularly adjustable means carried by said body for preventing the tilting of the hand.

8. A device of the character described, comprising a hollow body adapted to be held in the hand, said body being formed of a plurality of separable portions, means carried by one of said portions for maintaining the fingers in proper position for writing, a strip arranged upon one of said portions, a connecting bolt for securing said portions together and for clamping said strip to one of the portions, and means for connecting said strip to the wrist of the wearer.

9. A device of the character described, comprising a body having a curved surface, means arranged upon said body for maintaining the fingers in proper position for writing and said means being capable of being moved along said curved surface.

10. A device of the character described, comprising a body adapted to be held in the hand and having a curved surface, means arranged upon said body for maintaining the fingers in proper position for writing, said means being capable of being moved along said curved surface, and means for securing said body upon the wrist of the wearer.

In testimony whereof I affix my signature in presence of two witnesses.

SIDNEY R. SMITH.

Witnesses:
C. A. WHEELER,
J. A. THOMAS.